United States Patent
Debalme et al.

(10) Patent No.: US 6,605,171 B1
(45) Date of Patent: Aug. 12, 2003

(54) METHOD FOR MAKING HOLLOW SOLID GENERATED BY ROTATION

(75) Inventors: Jean-Paul Debalme, Chambery (FR); Jacques Voiron, St Jean de Couz (FR); Alexandre Cividino, Rue Docteur Desfrancois (FR)

(73) Assignee: Saint-Gobain Vetrotex France S.A., Chambery (FR)

( * ) Notice: Subject to any disclaimer, the term of this patent is extended or adjusted under 35 U.S.C. 154(b) by 0 days.

(21) Appl. No.: 09/581,207

(22) PCT Filed: Oct. 20, 1999

(86) PCT No.: PCT/FR99/02547

§ 371 (c)(1),
(2), (4) Date: Jun. 21, 2000

(87) PCT Pub. No.: WO00/24566

PCT Pub. Date: May 4, 2000

(30) Foreign Application Priority Data

Oct. 23, 1998 (FR) .............................. 98 13293

(51) Int. Cl.⁷ .............................................. B65H 81/00
(52) U.S. Cl. .................. 156/172; 156/169; 156/187
(58) Field of Search ........................ 156/173, 172, 156/175, 169, 425, 185, 187

(56) References Cited

U.S. PATENT DOCUMENTS

| | | | | |
|---|---|---|---|---|
| 4,010,054 A | * | 3/1977 | Bradt | 156/173 |
| 4,023,835 A | * | 5/1977 | Ewing et al. | 285/235 |
| 4,800,113 A | * | 1/1989 | O'Connor | 156/148 |
| 4,990,213 A | * | 2/1991 | Brown et al. | 156/425 |
| 4,992,133 A | * | 2/1991 | Border | 156/498 |
| 4,997,503 A | * | 3/1991 | Bohannan et al. | 156/173 |
| H1261 H | * | 12/1993 | Gibson et al. | 156/169 |

FOREIGN PATENT DOCUMENTS

EP 463611-a2 * 1/1992

OTHER PUBLICATIONS

Funck, et al, "Production–Based Internal Stresses in Wound Components" Kunstoffberater 39, No. 4, Apr. 1994, pp. 46–49.*

* cited by examiner

Primary Examiner—Jeff H. Aftergut
(74) Attorney, Agent, or Firm—Oblon, Spivak, McClelland, Maier & Neustadt, P.C.

(57) ABSTRACT

The present invention relates to a hollow body of revolution (1), the wall of which comprises an internal first region (a) made, at least on its external periphery, of a single thermoplastic organic material A, and a second region having a first part (b), arranged so as to be continuous with the first region (a) and made of a thermoplastic material identical to the material A and of continuous glass yarns embedded in the said thermoplastic material, and a second part (c) forming the external periphery of the hollow body and made only of thermoplastic material. According to the invention, the wall has a volume void content $V_v$ of less than 0.5%, preferably less than 0.2%.

14 Claims, 9 Drawing Sheets

METHOD FOR MAKING HOLLOW SOLID GENERATED BY ROTATION

The present invention relates to a hollow body of revolution based on a thermoplastic organic material, in which continuous glass filaments, helically wound around its axis, are embedded.

Although the invention is not limited to such an application, it will be more particularly described with reference to the manufacture of pipes of all types, especially those intended for conveying pressurized fluids.

Another advantageous application is the manufacture of tanks intended to contain fluids, especially pressurized fluids.

Plastics have already been widely used for this type of manufacture, but, in order to withstand the high pressures encountered, the wall of the pipes manufactured must necessarily have a very great thickness. This very great thickness gives the pipes a considerable weight.

In order to reduce the weight of such pipes, it has already been proposed for them to be reinforced by means of reinforcing fibres arranged at their surface. Such a solution has been envisaged, for instance, by Patent GB-A-2,077,880 which describes a composite pipe consisting of an extruded former made of PVC or of polypropylene immediately covered, in the axial direction, with continuous glass yarns impregnated with a thermoplastic resin, helically wound around which are continuous glass yarns impregnated with a thermosetting resin, the latter yarns themselves being covered with a layer of thermoplastic resin.

Apart from the fact that the continuous manufacture of these pipes is expensive and very complex, the life of these pipes is very short. This is because the various aforementioned materials of which they are composed rapidly delaminate from each other, thereby rapidly reducing their burst strength.

This is why Patent EP-A-0,697,553 has proposed another type of composite pipe consisting of an extruded plastic former within which short reinforcing fibres are dispersed, parallel to its axis, and around which continuous reinforcing fibres are helically wound.

It turns out that the short fibres very rapidly become detached from the extruded former, thereby creating in the latter fracture initiators which propagate rapidly. Consequently, the burst strength of the pipe rapidly decreases. To guarantee a minimum long-term burst strength, especially one that meets the standards in force, it is then necessary to compensate for rapid propagation of fractures by again increasing the thickness of the extruded former, which results in a non-negligible increase in the weight of the pipe.

Furthermore, even if a minimum long-term burst strength is guaranteed, short fibres, once loosened, appear at the inner surface of the former. When the fluid intended to be conveyed by the pipe is water, the food-related criteria that the pipe must meet are no longer satisfied since the visible short fibres run the risk of contaminating the said fluid.

The object of the present invention is therefore to alleviate the aforementioned drawbacks and especially to propose a pipe of the aforementioned type which is lightweight and has an excellent long-term burst strength.

To do this, the subject of the invention is a hollow body of revolution intended especially for containing a pressurized fluid, the wall of the body comprising in its thickness:
 a first region, the internal periphery of which is intended to be in contact with the fluid and at least the external periphery of which is made of a single thermoplastic organic material A, and
 a second region made of a thermoplastic material identical to the material A and of continuous glass yarns which are embedded in the said thermoplastic material and are wound helically around the longitudinal axis of the hollow body of revolution,
characterized in that
 the second region comprises in its thickness a first part arranged so as to be continuous with the first region of the body and made of the thermoplastic material A and the glass yarns, and a second part forming the external periphery of the body and made only of the thermoplastic material A, and
 the wall of the said body has a volume void content $V_v$ of less than 0.5%, preferably less than 0.2%.

It is specified that, within the context of the invention, the volume void content according to the invention may be measured in a known manner using a micrographic method of the image-analysis type. It is therefore appropriate to take several local measurements on the hollow body and to carry out a statistical analysis thereof.

It is also possible to calculate the volume void content differently, in a generalized way using the following formula:

$$V_v = (d_{th} - d_r)/d_{th}$$

in which $d_{th}$ and $d_r$ represent the theoretical density and the actual density of the body of revolution, respectively. The theoretical density is calculated from the density of the glass and from the various densities of the thermoplastic organic material A weighted by their relative percentages. As regards the actual density, this is calculated by taking the ratio of the actually measured mass of the body of revolution to the actual volume of the body.

The solution completely solves the problem posed. To achieve this, the inventors have firstly been able to analyse the key functions that a composite pipe must fulfil and to demonstrate the shortcomings of the composite pipes according to the prior art, such as those mentioned in the preamble.

According to this analysis, the reinforcing fibres must in principle withstand all the hoop and axial stresses due to the pressure exerted by the fluid flowing inside the pipe and the internal region made of thermoplastic organic material must be impervious to and chemically compatible with this same fluid. A simple hooping of continuous reinforcing fibres over a former made of thermoplastic organic material should therefore fulfil these functions.

Now, the inventors have discovered that, in order to guarantee the durability of a composite pipe of this type over time, it is absolutely necessary for there to be both effective protection of the fibres and perfect adhesion between the various elements of which it is composed.

They have thus been able to devise a body, as claimed, with a sufficiently intimate union between the various elements of which it is composed that a lifetime much longer than those encountered hitherto can be guaranteed.

Furthermore, the invention makes it possible to obtain pipes which are much easier to transport and handle.

According to one advantageous characteristic of the invention, the thermoplastic organic material A may be a polyolefin, of the polyethylene PE or polypropylene PP type, or else polyvinyl chloride (PVC). These materials have the advantages, among others, of being chemically inert, of being able to withstand very low temperatures and of having a low manufacturing cost.

The density d of the thermoplastic organic material A may vary through the thickness of the wall and may, especially, be between 0.915 and 0.960 g/cm$^3$.

According to an advantageous variant, the continuous glass yarns embedded in the thermoplastic organic material make an angle of between 50 and 55° with the axis of the said body. Such an arrangement allows the axial and hoop resistance of the body to the pressure exerted by a fluid flowing through or contained within it to be further increased, for the same amount of continuous glass yarns used.

According to another advantageous variant, the continuous glass yarns embedded in the thermoplastic organic material make an angle close to 90° with the axis of the body and other continuous glass yarns are embedded in the thermoplastic organic material, these being arranged longitudinally along the axis of the body.

The choice of one of these variants, of their combination or of another variant giving preference to a different angle of winding of the continuous glass yarns, as well as the choice of the respective amounts of the glass yarns in the direction in which they are placed, will be made according to the specific constraints associated with each application, such as the resistance to pressure, resistance to ovalization, flexural strength, tensile strength, etc.

Preferably, the continuous glass yarns are distributed uniformly in the first part of the second region of the wall of the hollow body. Such a distribution of the yarns in the thermoplastic organic material very favourably enhances the mechanical properties of the body and guarantees them in the long term.

The invention also relates to a composite pipe consisting of the body of revolution defined above, coated with an external finishing and protective layer made of thermoplastic organic material, preferably one identical to the material A.

The finishing layer according to the invention allows the pipe to be reliably protected against external attack likely to occur during storage, transportation, site operations and use.

The body or the pipe according to the invention are particularly suitable for containing and/or conveying pressurized fluids.

The invention also relates to a process for manufacturing a hollow body of revolution, the wall of which is based on a thermoplastic organic material A in which continuous glass yarns are embedded, these being wound helically around the axis of the body. According to this process, the following steps are carried out in line:

a) a tape in the heated state is wound helically around a rotating tube, at least the external face of the wall of which is based on the thermoplastic material A, the tape being made of the same thermoplastic material A and of continuous glass filaments embedded in this material;

b) part of the outer peripheral surface of the tube coated with the tape is heated in a zone located immediately downstream of the zone where the tape comes into contact with the tube, to a temperature above the melting point of the material A;

c) local pressure is applied to that part of the outer peripheral surface of the tube coated with the tape in a zone located immediately downstream of the heating zone of step b).

Advantageously, cooling is applied at the same time as the local pressure.

This process thus makes it possible to obtain a very good distribution of the glass filaments in the thermoplastic material by the use of a composite tape rather than a composite yarn as used in Patent Application EP 569,928.

Moreover, unlike the process of the invention which involves a heating step and a compression/cooling step downstream of the point where the tape is laid, the process of Application EP 569,928 reveals the need to simultaneously compress and heat the composite yarn on the tube when brining the yarn into contact with the said tube in order to make it easier for the turns of yarn to be bonded together and to expel the air between the filaments of the yarn, whereas, in the process of the invention, the heating is downstream, allowing the thermoplastic material of the tube and that of the tape, once the latter has been put into place, to fuse together, and the pressure, also applied downstream, makes it possible to remove the air between the layers of the tape but not at all between the glass filaments which are already contiguous, one against another, with no air being present because of the very nature of the product covering the tube, that is the tape.

Furthermore, the process of the invention is particularly advantageous to apply to a thermoplastic material of the polyolefin type, since, although this material has a high viscosity, and is therefore difficult to process, especially in combination with fibres as is pointed out in Application EP 569,928, the process succeeds perfectly in fusing the thermoplastic material of the tube with that of the composite material of the tape covering it. It is all the more important to stress this arrangement since polyolefin-type materials are advantageously of low cost and compatible from the food standpoint.

Preferably, the tape arrives for step a) in the heated state, having undergone, in a zone located near the tube, an operation of surface heating to a temperature above the softening temperature of the material A but below its degradation temperature.

Also preferably, prior to step a), the following steps are also carried out in line:

continuous comingled yarns, consisting of intimately mixed glass filaments and filaments of material A in the form of at least one sheet of parallel yarns, are led in and assembled;

the said sheet is introduced into a zone where it is heated to a temperature between the melting point and the degradation temperature of the material A;

the heated sheet is made to pass through an impregnation device so as to obtain a densified and laminated tape of flatter shape than the tape as in step a);

the laminated tape is introduced into a zone where it is heated to a temperature between the melting point and the degradation temperature of the material A so as to obtain the heated tape as in step a).

According to this variant of the process, it is possible to use windings of comingled yarns obtained in a direct process, such as that described in Patents EP 0,367,661, WO 98/01751 and EP 0,599,695, which yarns have the advantage of having an excellent comingling index, especially by virtue of the stability of the process. Within the context of the invention, the expression "excellent comingling index" should be understood to mean a comingling index whose mean value is less than 12. It should be pointed out that the mean value of the comingling index is calculated in the following manner:

a number of cross sections are made along a given length of comingled yarn;

a grid is placed over each of these sections;

the surface distribution of the glass filaments and the filaments of thermoplastic organic material is measured for each grid cell using a micrographic method of the image-analysis type;

for each section, the standard deviation of the surface distributions of each of the grid cells is calculated, this being the comingling index of the section in question;

the mean value of the comingling index for all the sections is calculated.

This excellent comingling index results in an excellent distribution of the glass yarns in the thermoplastic material parallel to the axis of the body with the concomitant advantages such as those mentioned above.

Finally, the invention relates to an apparatus for implementing the process defined hereinabove. This apparatus is notable in that it comprises:

means for at least surface heating a tape consisting of continuous glass yarns embedded in a thermoplastic organic material A, in a zone located near a tube, at least the external face of the wall of which is based on the same material A, rotating about its axis;

means for helically winding the heated tape around the rotating tube;

means for heating part of the outer peripheral surface of the tube coated with the tape, in a zone located immediately downstream of the zone where the tape comes into contact with the tube, to a temperature above the melting point of the material A;

means for applying local pressure to that part of the outer peripheral surface of the tube coated with the tape, in a zone located immediately downstream of the heating zone.

According to a preferred variant, the means for surface heating the tape comprise at least one infrared-type oven, preferably one operating with strips or lamps regulated in terms of power according to the temperature of the surface-heated tape. Such an oven has the advantage of being both of high performance from the energy standpoint and of being easy to regulate.

Advantageously, the winding means comprise a laying head which facilitates the process of putting the heated tape according to the invention in place. The laying head is able to rotate in a controlled manner; preferably, it comprises three mutually parallel rollers of hyperboloidal shape, the longitudinal axis of which is approximately perpendicular to the direction in which the tape runs, this itself being parallel to the axis of pivoting of the laying head. Such a configuration for the laying head considerably improves the precision and reproducibility with which the tape is put into place on the tube.

According to an additional characteristic, the means for heating the tube coated with the tape comprise a hot-air-blowing nozzle of approximately oblong cross section.

According to another characteristic, the means for applying the localized pressure comprise at least one rotating roller pressurized by an actuator.

When all the steps according to the invention are carried out continuously, using wound packages of continuous comingled yarns obtained especially by a direct process, the apparatus may furthermore comprise:

means for leading in and assembling continuous comingled yarns consisting of intimately mixed glass filaments and filaments of material A in the form of at least one sheet of parallel yarns;

means for heating the said sheet to a temperature between the melting point and the degradation temperature of the material A;

a device for impregnating the heated sheet so as to obtain a densified and laminated tape of flattened shape;

means for maintaining the tape at a temperature between the melting point and the degradation temperature of the material A as far as the means for winding the tape.

According to this variant, the winding and assembling means comprise a creel, from which packages of intimately mixed continuous comingled yarns consisting of glass filaments and filaments of material A are unwound, and at least one roller for guiding the comingled yarns.

Further details and advantageous features will emerge below from reading the detailed description of an illustrative but non-limiting example of the invention, with reference to FIGS. 1a to 3c which show, respectively:

FIGS. 1b and 1c: two micrographic sections showing the thickness of the wall of the hollow body according to FIG. 1a;

Figure 1A:
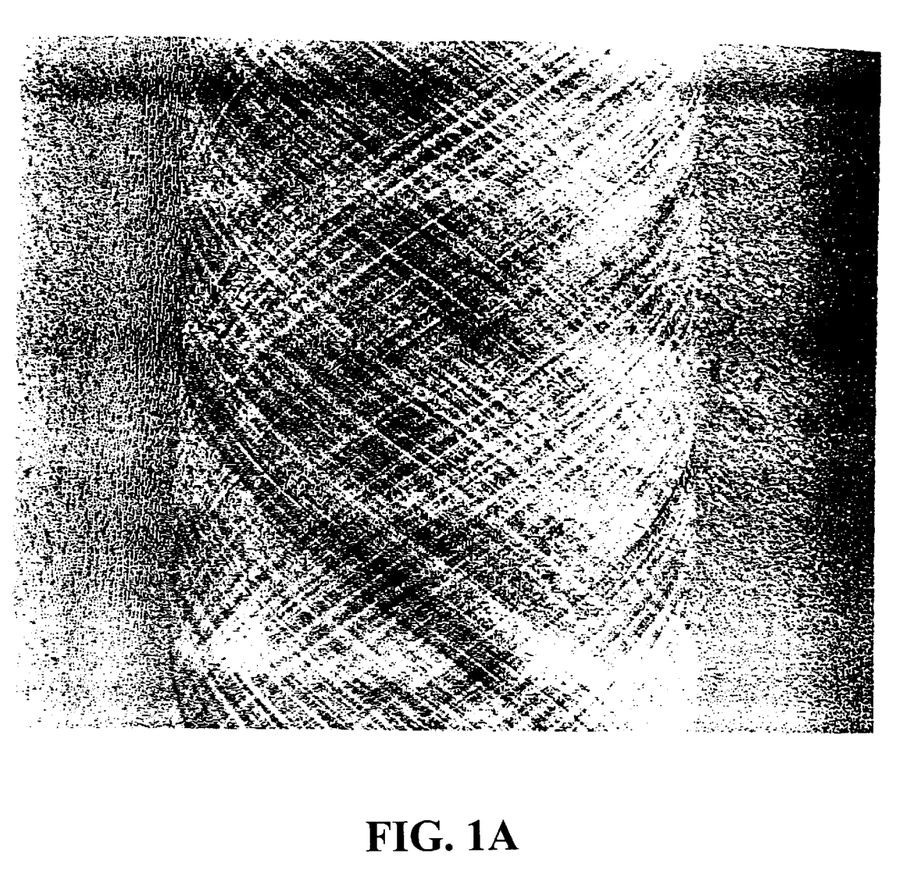
FIG. 1a: an image of part of a hollow body according to the invention.

FIG. 1a shows an image of the outer surface of part of a hollow body 1 made of an organic thermoplastic material A, for example polyethylene, reinforced with continuous glass yarns according to the invention, the external diameter of which is 200 mm. This image shows the perfect homogeneity of this part of the pipe over its entire height, with, in particular, a uniform diamond-shaped pattern. This pattern is characteristic of one of the steps of the manufacturing process according to the invention and shows the angle at which the continuous glass yarns have been wound.

The weight of this part of the hollow body is approximately 4 kg/m.

Figure 1B:
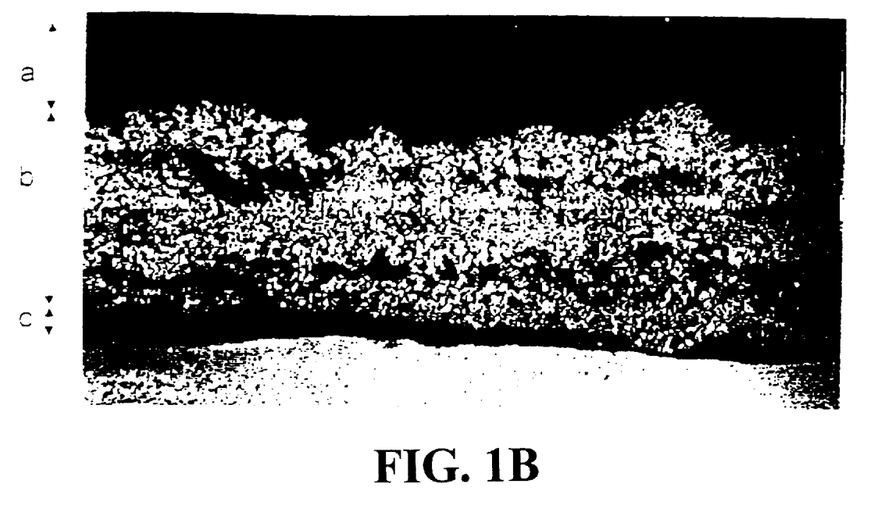
Figure 1C:
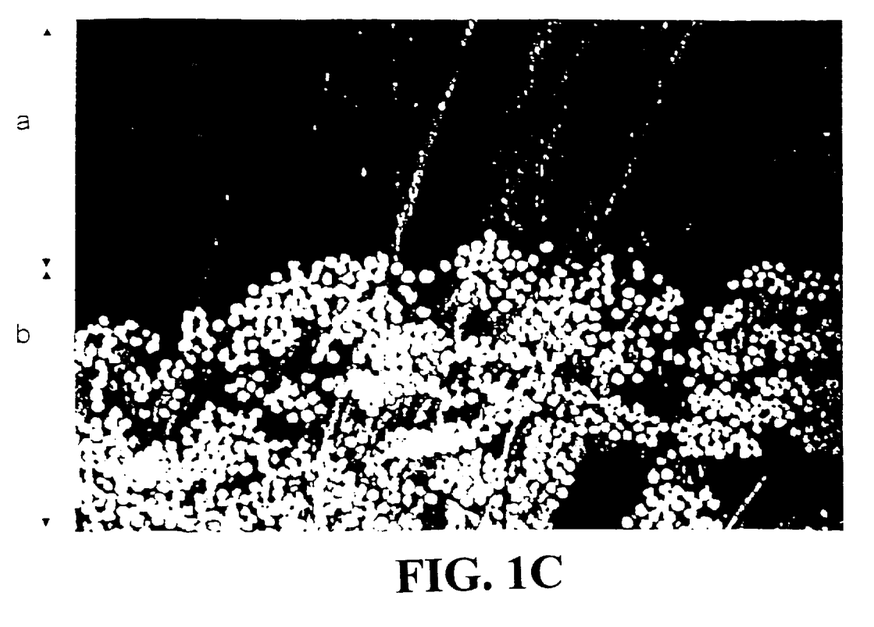

FIGS. 1b and 1c are two micrographic sections showing the thickness of the wall of this part of the hollow body, these being obtained using a microscope. FIG. 1b shows the particular structure of part of the hollow body. This part is divided, in the thickness direction, into:

an internal first region a, the internal periphery of which is intended to be in contact with the fluid flowing or stored in the hollow body, this region comprising pure polyethylene with a mean density of approximately 0.955 $g/cm^3$, the melt flow index (MFI) of which, at a temperature of 190° C. and for a weight of 5 kg, is 0.45;

a second region composed of polyethylene with a mean density of approximately 0.952 $g/cm^3$, the melt flow index (MFI) of which, at a temperature of 190° C. and for a weight of 2.16 kg, is 18, and of continuous glass yarns uniformly distributed along the axis and embedded in the thickness of this region.

The second region is more particularly divided in its thickness direction, on the one hand, into a part b which is arranged so as to be continuous with the first region a of the hollow body and comprises polyethylene and the glass yarns and, on the other hand, into a part c constituting the external periphery of the hollow body and comprising only polyethylene.

In fact, it is clearly apparent from the view in FIG. 1c, which represents a local ×8 magnification of the previous figure, that there is no visible "boundary" between the first region a and the part b of the second region. This absence of a "boundary" shows the perfect continuity of the thermoplastic organic material used. There was therefore, during the process of manufacturing the hollow body, perfect union between the two varieties of polyethylene of different densities, as will be explained below.

A measurement method, such as that of image analysis described above, makes it possible to quantify the volume void content of the wall of this part of the hollow body 1—it is about 0.2%.

Figure 2A:
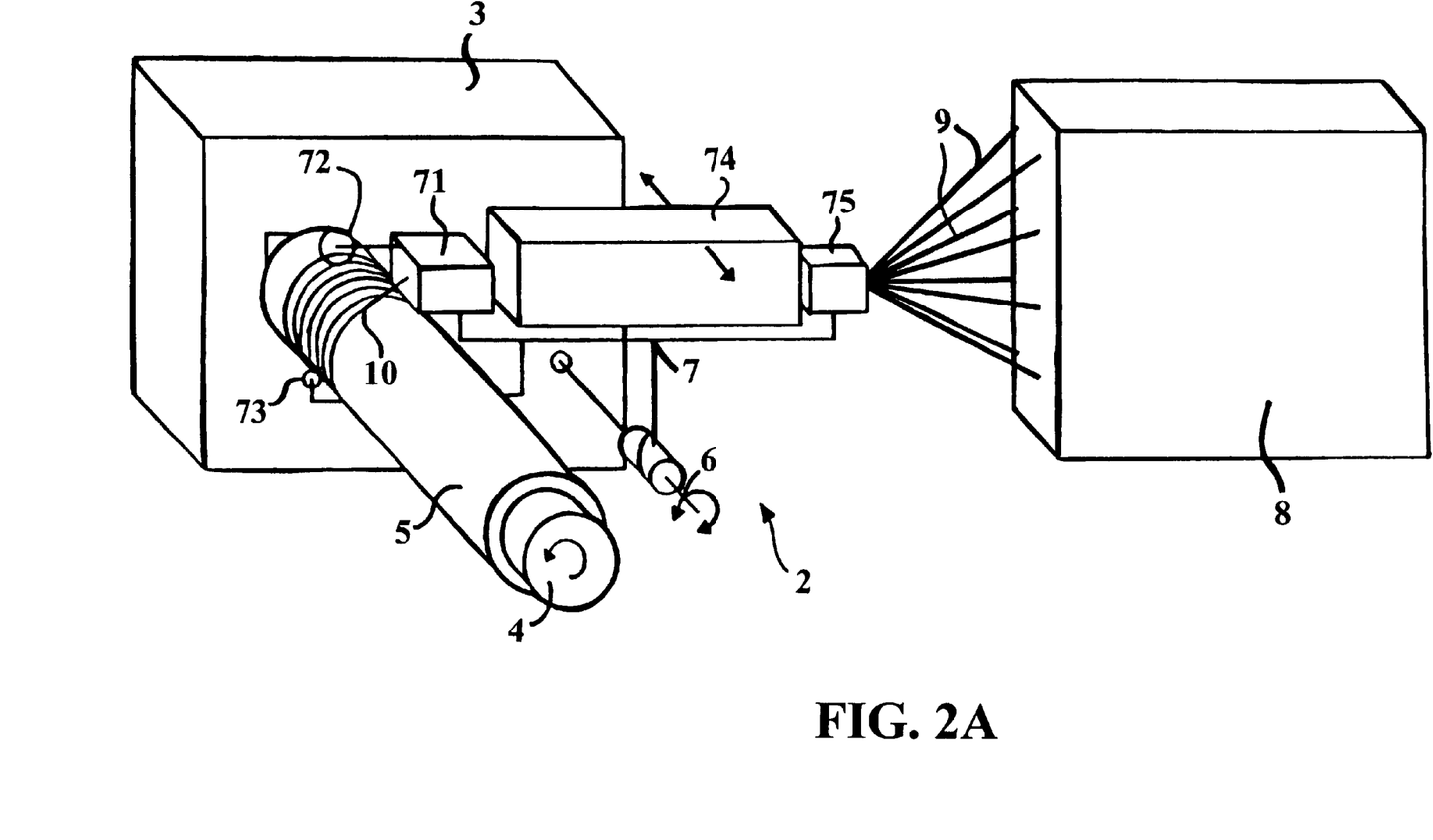
FIGS. 2a to 2e: a general schematic representation of the apparatus used for manufacturing the hollow body according to FIG. 1a as well as those of the various parts of this same apparatus.

FIG. 2a is a general schematic representation of the apparatus which was used to manufacture the hollow body as in FIG. 1a. This apparatus 2 firstly comprises a stand 3 inside which are fixed a motor and its system for synchronizing the various movements (not shown).

Projecting from this stand 3 is a mandrel 4 capable of being rotated, the cross section of which mandrel has been expanded by inflation so that the extruded tube 5 made of PE 100 polyethylene, with a thickness of 5 mm, is fitted over it with an interference fit. Also projecting from this stand 3 is a shaft 6, the rotation of which ensures that a carriage assembly 7 moves translationally parallel to the mandrel 4.

This carriage assembly 7 supports, respectively, a head 71 for laying the constituent material of the second region of the hollow body, formed by the parts b and c, a press roller 72, the height of which is adjusted by a hydraulic actuator (not shown), a hot-air-blowing nozzle 73, a heating chamber 74 and a tensioning device 75.

Upstream of the carriage assembly 7 there is a creel 8 from which wound packages of continuous comingled yarns 9, consisting of 800 glass yarns and 800 polyethylene filaments, all intimately mixed, are unwound. These comingled yarns 9 are sold under the brand name TWINTEX® by Vetrotex, the percentage weight ratio preferably being 60 in the case of the glass and 40 in the case of the polyethylene. Such a ratio makes it possible, when producing the hollow body, to obtain the best compromise between, respectively, the ease of processing and the mechanical performance both in the longitudinal direction and the transverse direction.

The general operating principle of this apparatus 2 is given below.

The continuous comingled yarns coming from the unwound packages are firstly assembled in the form of a sheet of mutually parallel yarns. This sheet passes through the tensioning device 75, which tensions it, and then into the heating chamber 74, which will be explained in detail below. On leaving this chamber 74, the sheet has been converted into a tape 10, the polyethylene outer skin of which is still soft and has a temperature between 150 and 185° C. Next, the tape 10 runs through the laying head 71 and emerges from the latter so as to be suitably applied over the tube 5. The laying head is moved translationally parallel to the longitudinal axis of the tube, while the latter is rotated so that the tape, and therefore the glass yarns, are wound helically around it at an advantageous angle of between 50 and 55° with respect to the longitudinal axis, although this angle could also be close to 90°. The winding angle depends on the speed of movement of the carriage and on the speed of rotation of the tube. In a zone located immediately downstream of the zone where the tape 10 and the tube 5 come into contact, a hot-air-blowing nozzle 73 heats part of the outer peripheral surface of the tube 5 coated with the tape 10 to a temperature between 200 and 240° C. Immediately downstream of this heating zone, the press roller 72 applies local pressure to that part of the outer peripheral surface of the tube 5 which is coated with the tape 10 and heated, so as to secure the tape 10 to the tube 5. Since all the elements, being mounted on the movable carriage 7, move parallel to the longitudinal axis of the tube 5, as mentioned above, the latter becomes entirely coated with the tape 10 by the to-and-fro movement of the carriage 7. This movement is obtained by the operation of the aforementioned synchronization system.

The various parts of the apparatus will now be described in greater detail with reference to FIGS. 2b to 2e.

The creel 8 (not shown) is essentially composed of a frame comprising horizontal rotating spindles supporting the packages of comingled yarns according to the invention, these being sold under the brand name TWINTEX®. These rotating spindles are braked by a suitable device, the function of which is to regulate the tension of the comingled yarns and prevent the packages from unwinding in an uncontrolled manner. Obviously, the creel 8 may be stationary or move with the movement of the carriage 7. This will depend in particular on the length of the tube 5 to be coated according to the invention.

Figure 2B:
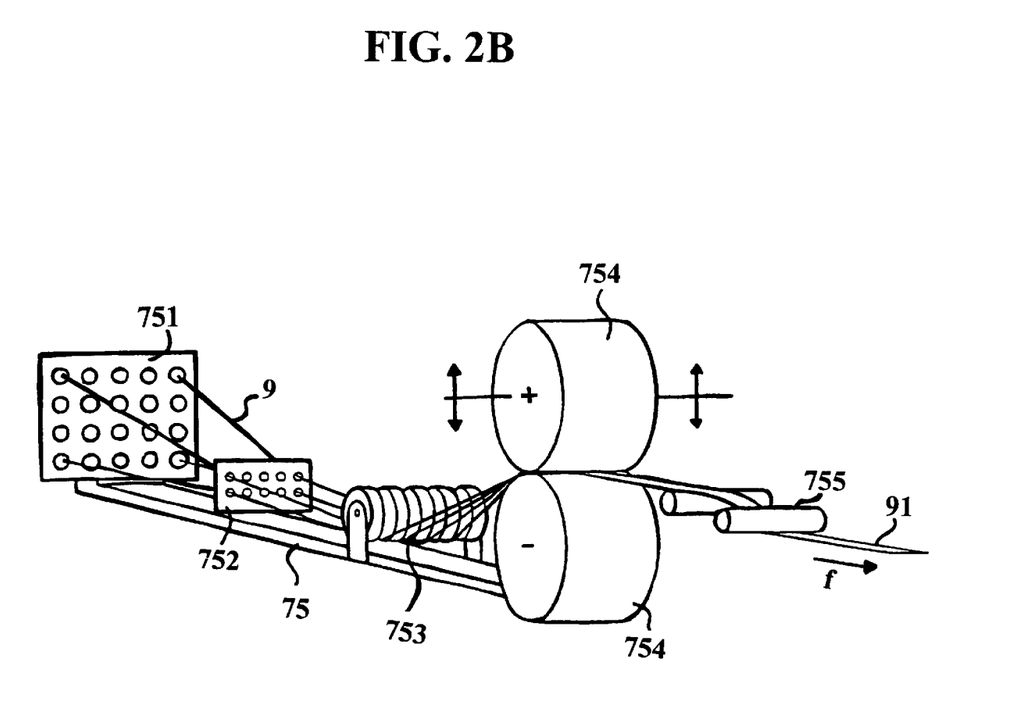

FIG. 2b is a detailed perspective view of the tensioning device 75 used according to the invention. It comprises, respectively, in the direction indicated by the arrow f which gives the direction in which the comingled yarns 9 run, a first eyelet plate 751, a second perforated plate 752 parallel to the first, a grooved roller 753, two contacting wheels 754 and finally a tension feed 755. The eyelet plate 751 brings the comingled yarns 9 together and guides them at a shallow angle towards the perforated plate 752. The latter brings them together in pairs and aligns them with the roller 753, the grooves of which keep a uniform spacing between the yarns 9 so as to obtain a homogeneous sheet 91 after they have passed between the two contacting wheels 754. One of these two wheels 754 is provided with a speed sensor measuring the speed of the sheet 91, the contact between the wheels being such that the sheet 91 is driven through without slipping. As regards the tension feed 755, this reduces the spreading of the comingled yarns 9, thereby avoiding any risk of the polyethylene yarns sticking to the walls of the heating device 74 which are raised to a high temperature.

Figure 2C:
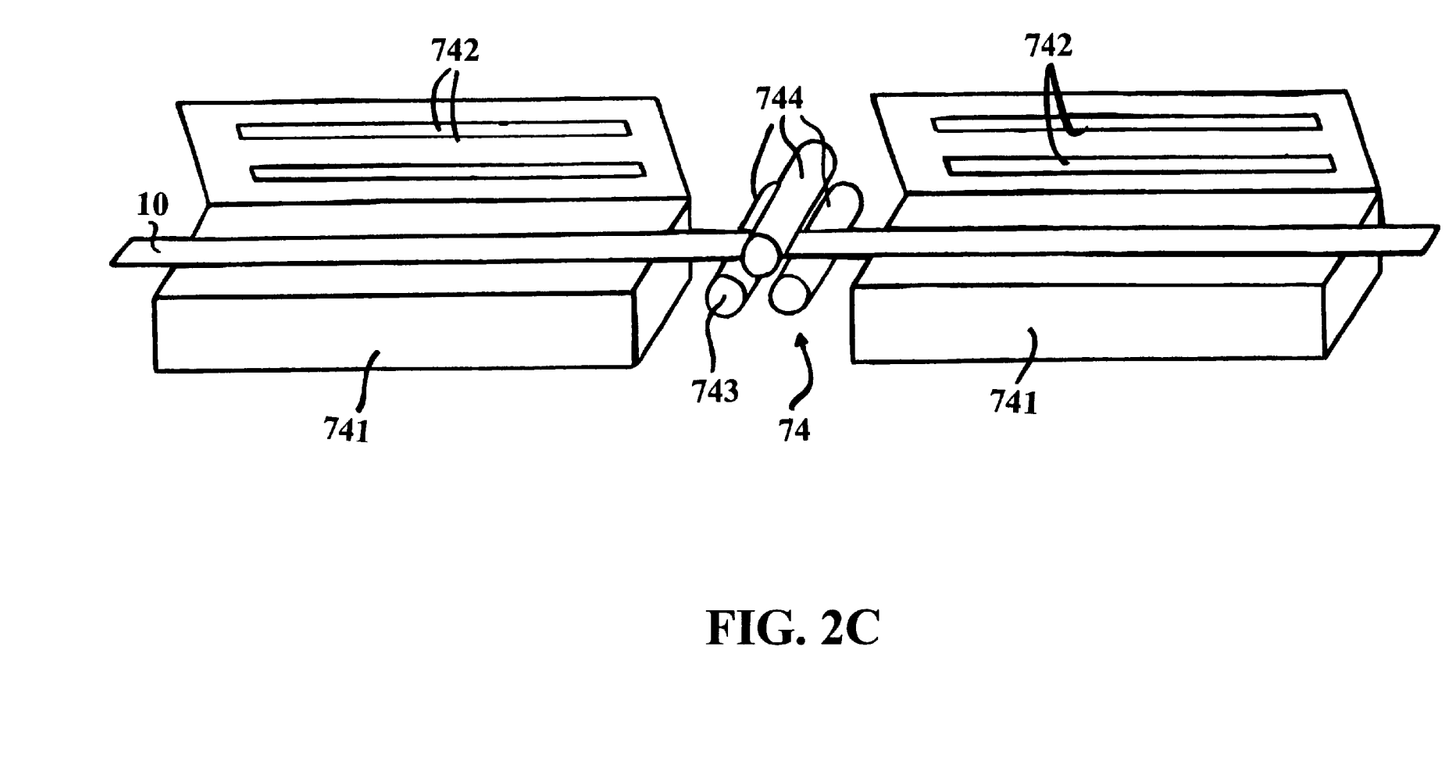

As shown in FIG. 2c, the heating device 74 comprises two aligned ovens 741, the heat sources of which are power-regulated infrared lamps 742, and between these ovens there is an impregnation device 743 which, by flattening the sheet 91, makes it possible to obtain a tape 10 by removing, firstly, the air contained between the yarns, in order to densify the material, and, secondly, by completely embedding the glass filaments in the thermoplastic material A. This step in the process of the invention plays an essential part in achieving the low void content of the part b of the hollow body subsequently obtained. The ovens are regulated so that the temperatures reached by the tape 10 on leaving the oven 741 further upstream, that is to say the one closest to the tensioning device 75, are between 170 and 180° C., while those reached on leaving the oven further downstream, that is to say the one closest to the laying head, are between 175 and 185° C. The impregnation device 743 consists of three mutually parallel heating rolls 744 arranged in a triangular configuration. The height of the upper roll can be adjusted so that the tape 10 is flattened to a greater or lesser extent.

Figure 2D:
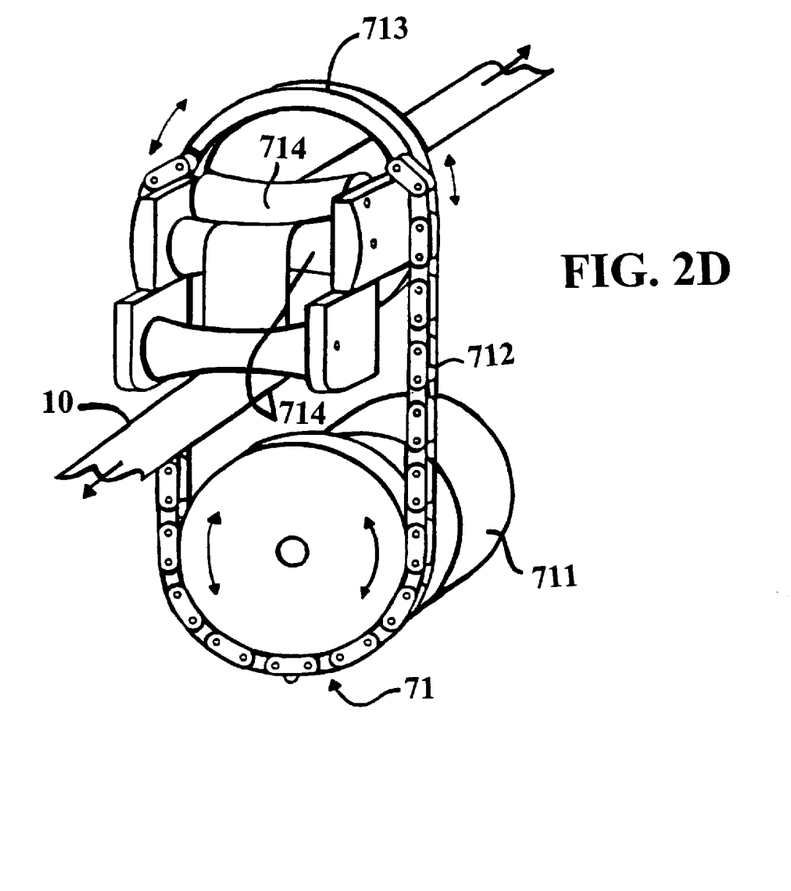

FIG. 2d shows the detailed structure of the laying head 71. This head 71 comprises a rotary actuator 711 with adjustable stops, the rotation of which drives, via a drive chain 712, a circular ball bearing 713 fastened to three rollers 714 of hyperboloidal shape which can be rotated about themselves. The rotation of the rotary actuator 711, which is returned by two springs (not shown), makes it possible to make the head pivot advantageously about an axis parallel to and approximately coincident with the mid-axis of the tape, in one direction or in the opposite direction, in order for the head to be inclined towards the direction of linear movement of the carriage 7 so as to prevent distortion of the tape during winding, the angle of inclination given the head being tailored to the desired angle of helical winding of the tape. The rollers 714 are all heated and temperature-controlled so that the tape 10 is maintained at a sufficiently high temperature as it leaves the laying head 71. This advantageous structure allows the tape to be laid very precisely and very reproducibly.

Figure 2E:
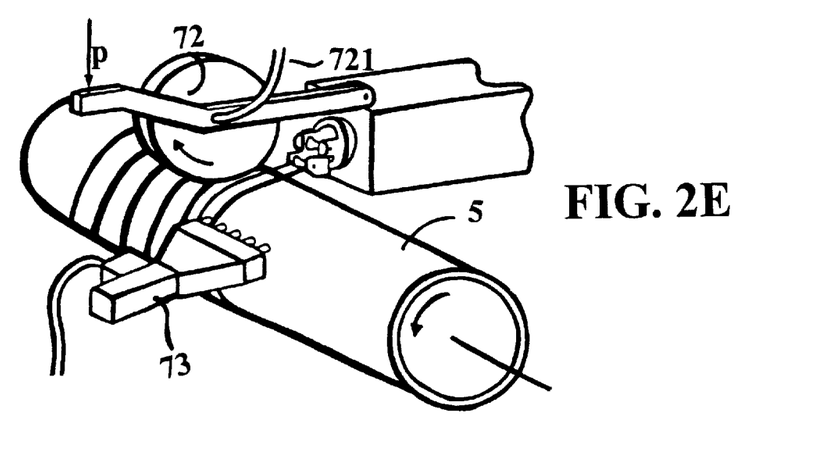

Finally, FIG. 2e shows the specific arrangement of the various elements of the apparatus according to the invention in its downstream part. According to this arrangement, the oblong hot-air-blowing nozzle 73 is placed perpendicular to the tube 5, being aligned with the laying head 71 in a position diametrically opposite the latter. The press roller 72, the contact pressure of which, represented by the arrow P, is exerted via a hydraulic actuator (not shown), is fastened to the movable carriage and placed away from the laying head by a distance equivalent to approximately the width of the tape 10. This roller is cooled by a fluid arriving via a hose 721. This arrangement of the various elements at this point in the manufacture makes it possible to obtain, by fusing the polyethylene of the tape 10 and that of the tube 5 together, perfect continuity between the polyethylene of the first region of the hollow body and that of the part b of the second region, and makes it possible for a thin film of polyethylene to be exuded in the outer peripheral part and enclose the glass yarns in the thickness of the hollow body, in order to form the part c. This arrangement also allows the air between the plies of the tape to be expelled. In particular, it is important for the heating nozzle 73 and the press roller 72 to be placed downstream of the laying of the tape and therefore not to be employed at the moment when the tape comes into contact with the tube. This is because, since the laying head undergoes a to-and-fro movement along the length of the tube and therefore passes back into the same contact zone, if the heating nozzle were to act at the moment when the tape comes into contact with the tube the latter would end up being heated, which would therefore increase its diameter, and the final layers of the tape would then be laid over a larger circumference; on cooling, since the thermoplastic contracts, the glass filaments would unfortunately no longer be tight around the tube.

That part of the hollow body shown in FIG. 1a is obtained, after optimized adjustment of the parameters affecting the temperatures reached during the process, and therefore the desired degree of union according to the invention between the glass filaments and the thermoplastic material and between the various types of thermoplastic material of different densities of the tube and of the tape respectively, the parameters being the speed of rotation of the mandrel 4, the translational movement carried out by the movable carriage 7 by rotation of the mandrel, the flow rate and the temperature of the air blown by the nozzle 73, the distance between the tube 5 and the nozzle 73 and the pressure exerted by the hydraulic actuator on the press roller 72.

Table 1 below gives, by way of example, for a hollow body according to the invention of external diameter equal to 200 mm, having a tape-winding angle of 55° and with a thickness of the combined regions b and c of 1.2 mm, the weight in kg/m, a total wall thickness without the finishing layer in mm, the stiffness in kN/m² and the burst pressure in bar.

TABLE 1

|  | Example according to the invention |
| --- | --- |
| Weight (kg/m) | 4.0 |
| Total thickness (mm) | 6.2 |
| Stiffness (kN/m²) | 12 |
| Burst pressure (bar) | >70 |

In order to obtain an end-product of the pipe type serving for conveying fluids, it is necessary for the external wall of this pipe to be guaranteed against any external attack; for this purpose, provision is made to coat the hollow body of the invention with an external finishing and protective layer by extruding the layer, preferably using polyethylene.

It is accepted that after 50 years pure polyethylene retains less than 50% of its initial characteristics. Moreover, it has been demonstrated that the accelerated ageing tests, carried out by a technique well known to manufacturers of polyethylene products, apply to the material of the invention. Thus it has been demonstrated that such a pipe according to the invention preserves high mechanical performance levels over time, retaining 60 to 80% of its initial characteristics.

Table 2 below is a comparison of the tensile strength of the material after 50 years between the pipe according to the invention and a pipe made of pure polyethylene.

TABLE 2

|  | Tensile strength (MPa) | |
| --- | --- | --- |
|  | Initial value | After 50 years |
| Pipe according to the invention | 800 | 500 to 600 |
| Pipe made of pure polyethylene | 20 | 10 |

Figure 3A:
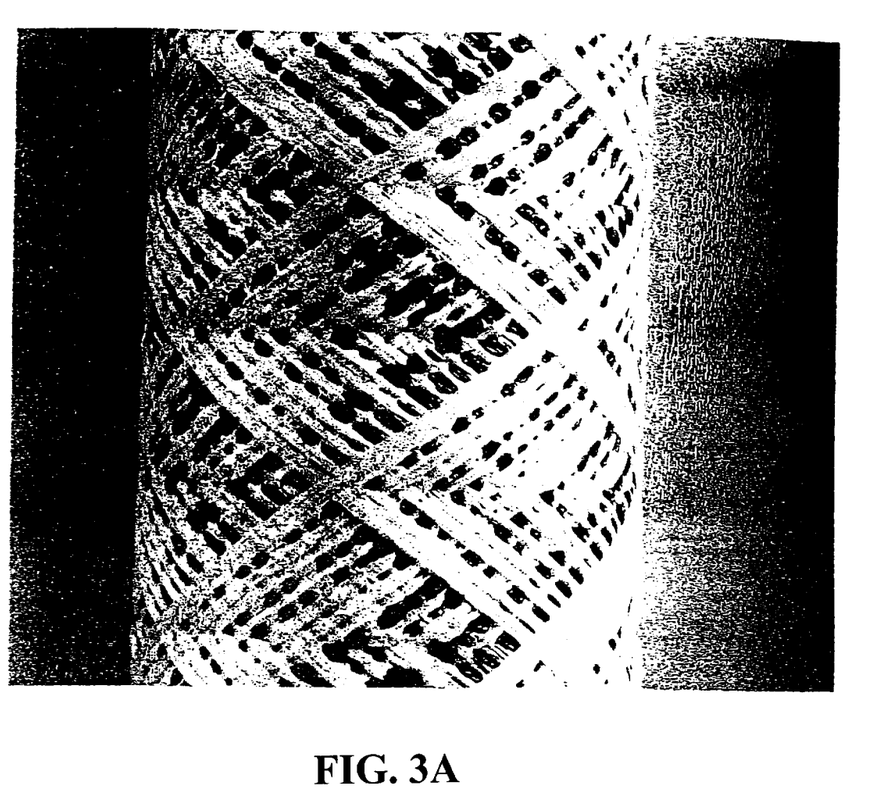
FIGS. 3a to 3c: images of hollow bodies, given by way of comparative examples.
Figure 3B:
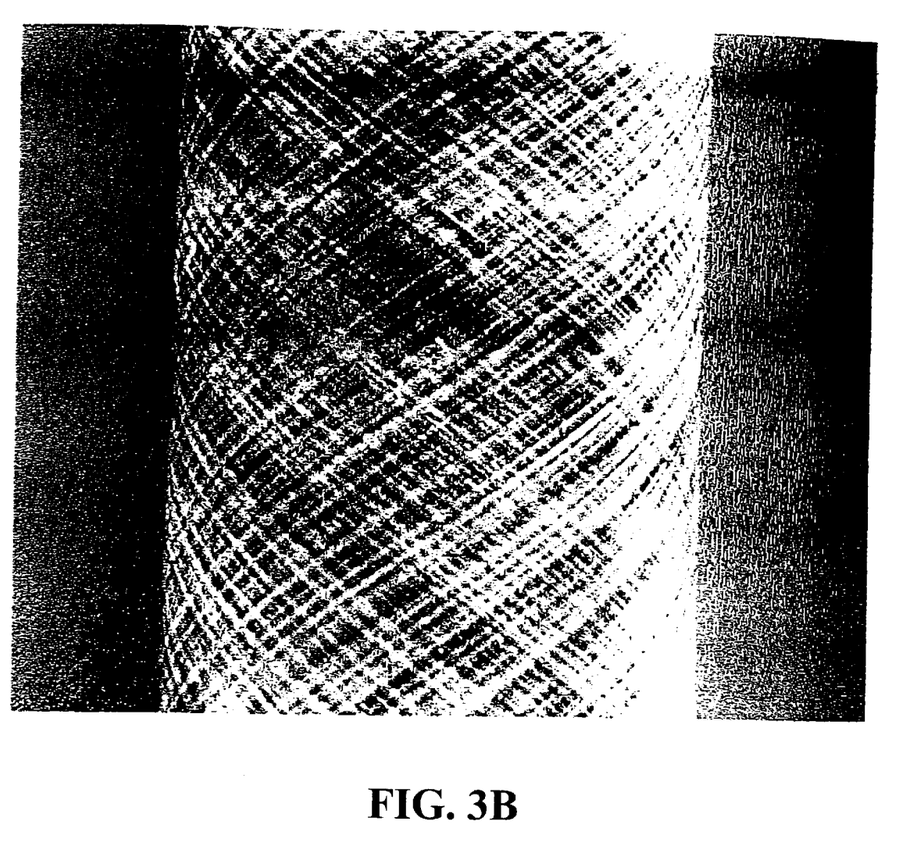
Figure 3C:
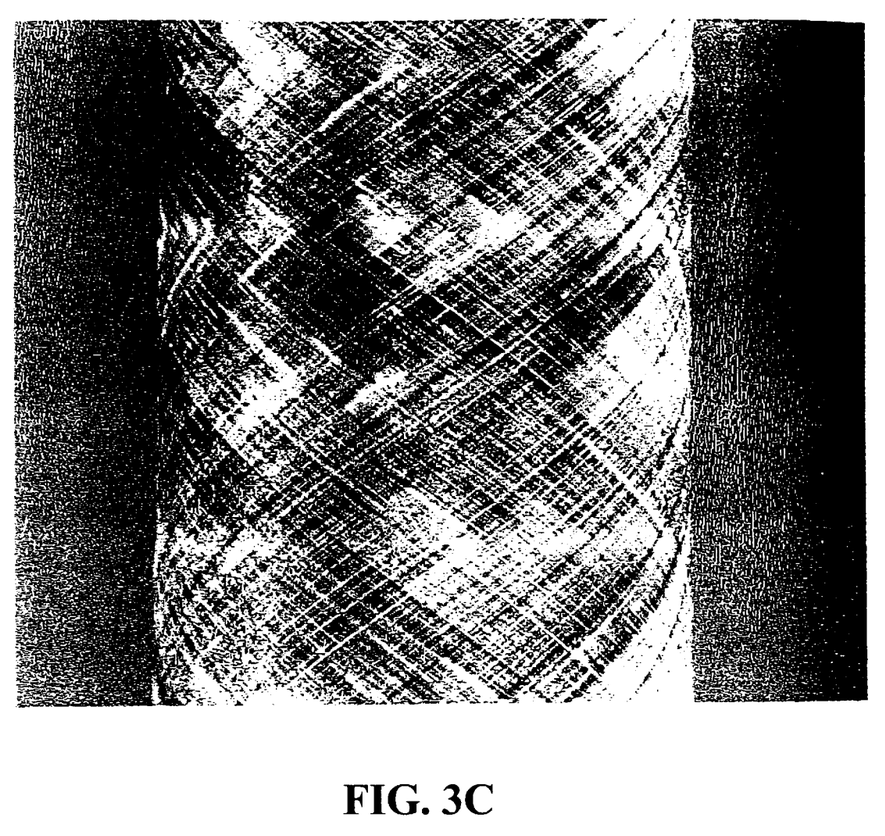

Finally, FIGS. 3a to 3c show images of parts of the hollow body, these being given by way of comparative examples:

the part of the hollow body in FIG. 3a was obtained using the same manufacturing apparatus 2 as that just described, but from only packages of continuous glass yarns;

the part of the hollow body in FIG. 3b was also obtained using the same manufacturing apparatus 2, but from packages of continuous glass yarns and of co-wound polyethylene yarns, but with no comingling of them;

finally, the part of the pipe in FIG. 3c was obtained using the same manufacturing apparatus 2, from the same packages of comingled yarns used according to the invention, namely those sold under the brand name TWINTEX®, but without preheating the tape before it is deposited on the tube.

After analysing these images, it may be seen that none of these parts of a hollow body exhibits the homogeneity of the part of a pipe according to the invention which is shown in FIG. 1a, this homogeneity being characterized by perfect impregnation of the TWINTEX with the polyethylene of the tube, and that, more specifically:

the use of only glass yarns does not allow the yarns to be impregnated by the polyethylene of the tube 5, although the latter melts superficially;

the use of co-wound glass yarns and polyethylene yarns, but with no comingling, results in poor impregnation of the glass yarns by the polyethylene, this being revealed by a localized whitish colour, as well as microscopic regions lacking in cohesion;

the fact of not preheating the tape does not result in a lack of impregnation, but in localized microscopic regions of the said material or of the said tube lacking in cohesion.

Table 3 below illustrates a comparison of the burst pressures between the various pipes shown in FIGS. 3a to 3c and the pipe according to the invention in FIG. 1a.

TABLE 3

|  | Burst pressure (bar) |
| --- | --- |
| FIG. 3a: glass alone | 20 |
| FIG. 3b: co-wound, but not comingled, glass and PE | 27 |
| FIG. 3c: TWINTEX, tape not preheated | 28 |
| FIG. 1a: TWINTEX, with preheated tape | 40 |

It goes without saying that many modifications may be made without thereby departing from the scope of the invention.

What is claimed is:

1. Process for manufacturing a hollow body of revolution, the wall of which is made of a material comprising a thermoplastic organic material in which continuous glass yarns are embedded, said material being wound helically around the axis of said body, comprising carrying out the following steps in line:
    a) helically winding a tape in the heated state around a tube rotating about its axis without applying heat where the tape comes in contact with the tube, at least the external face of the wall of which tube comprises the thermoplastic organic material, the tape comprising the thermoplastic material and the continuous glass yarns;
    b) heating part of the outer peripheral surface of the tube coated with the tape in a zone located immediately downstream of the zone where the tape comes into contact with the tube, to a temperature above the melting point of the thermoplastic organic material;
    c) applying local pressure to that part of the outer peripheral surface of the tube coated with the tape in a zone located immediately downstream of the heating zone of the step b).

2. Process according to claim 1, comprising subjecting the tape prior to arrival for step a) in the heated state, in a zone located near the tube, to at least surface heating to a temperature above the softening temperature of the thermoplastic organic material.

3. Process according to claim 1, comprising, prior to step a), carrying out the following additional steps in line:
    leading in and assembling continuous comingled yarns, consisting of intimately mixed glass filaments and filaments of the thermoplastic organic material in the form of at least one sheet of parallel yarns;
    introducing the sheet into a zone where it is heated to a temperature between the melting point and the degradation temperature of the thermoplastic organic material;
    causing the heated sheet to pass through an impregnation device so as to obtain a densified and laminated tape of flatter shape than the tape as in step a);
    introducing the laminated tape into a zone where it is heated to a temperature between the melting point and the degradation temperature of the thermoplastic organic material so as to obtain the heated tape for step a).

4. Process according to claim 1, wherein the thermoplastic organic material is a polyolefin or polyvinyl chloride.

5. Process according to claim 4, wherein the thermoplastic organic material is polyethylene.

6. Process according to claim 1, wherein the density d of the thermoplastic organic material varies through the thickness of the wall.

7. Process according to claim 1, wherein the density d of the thermoplastic organic material is between 0.915 and 0.960 g/cm$^3$.

8. Process according to claim 1, wherein the continuous glass yarns make an angle of between 50 and 55° with the axis of the body.

9. Process according to claim 1, wherein continuous glass yarns embedded in the thermoplastic organic material make an angle close to 90° with the longitudinal axis of the body and wherein other continuous glass yarns are embedded in the thermoplastic organic material, these being arranged longitudinally along the axis of the body.

10. Process according to claim 1, wherein the wall of the hollow body comprises in its thickness:
    a first region (a), the internal periphery of which is intended to be in contact with a fluid and at least the external periphery of which is made of the thermoplastic organic material, and
    a second region made of a thermoplastic material identical to the thermoplastic organic material and of continuous glass yarns which are embedded in the thermoplastic material and are wound helically around the longitudinal axis of the hollow body of revolution, and wherein
    the second region comprises in its thickness a first part (b) arranged so as to be continuous with the first region (a) of the body and made of the thermoplastic organic material and glass yarns, and a second part (c) forming the external periphery of the body and made only of the thermoplastic organic material, and wherein
    the wall of the said body has a volume void content $V_v$ of less than 0.5%.

11. Process according to claim 10, wherein the volume void content $V_v$ is less than 0.2%.

12. Process according to claim 10, wherein the continuous glass yarns are distributed uniformly in the first part (b) of the second region of the wall of the hollow body.

13. Process according to claim 1, which additionally comprises coating said hollow body of revolution with an external finishing and protective layer comprising a thermoplastic organic material, thereby forming a composite pipe.

14. Process according to claim 13, wherein the thermoplastic organic material in said external finishing and protective layer is identical to the thermoplastic organic material in the hollow body.

* * * * *